(12) United States Patent
Kabuki et al.

(10) Patent No.: US 7,050,164 B2
(45) Date of Patent: May 23, 2006

(54) SPECTROPHOTOMETER

(75) Inventors: Kouhei Kabuki, Hitachinaka (JP); Yoshisada Ebata, Hitachinaka (JP); Tadashi Suzuki, Kasama (JP); Atsushi Hiyama, Oarai (JP)

(73) Assignee: Hitachi, Ltd., Tokyo (JP)

( * ) Notice: Subject to any disclaimer, the term of this patent is extended or adjusted under 35 U.S.C. 154(b) by 450 days.

(21) Appl. No.: 09/943,395

(22) Filed: Aug. 30, 2001

(65) Prior Publication Data
US 2002/0050560 A1 May 2, 2002

(30) Foreign Application Priority Data
Nov. 2, 2000 (JP) .................................. 2000-335850

(51) Int. Cl.
*G01J 3/427* (2006.01)

(52) U.S. Cl. .................... 356/319; 356/320; 356/325

(58) Field of Classification Search ............... 356/325, 356/319, 320, 326, 328; 250/214 C, 216, 250/578.1
See application file for complete search history.

(56) References Cited

U.S. PATENT DOCUMENTS

| | | | |
|---|---|---|---|
| 4,171,913 A | 10/1979 | Wildy et al. | |
| 4,180,327 A | 12/1979 | Maeda et al. | |
| 4,227,811 A | * 10/1980 | Tohyama et al. | 356/325 |
| 4,281,897 A | * 8/1981 | Fletcher | 250/233 |
| 4,444,499 A | * 4/1984 | Akiyama et al. | 356/325 |
| 4,455,097 A | * 6/1984 | Ichikawa et al. | 356/323 |
| 4,545,681 A | 10/1985 | Watanabe | |
| 4,609,289 A | 9/1986 | Ritzl | |
| 4,678,917 A | * 7/1987 | Helms et al. | 250/373 |
| 4,835,393 A | * 5/1989 | Krauss | 250/373 |
| 5,825,484 A | * 10/1998 | Iwasaki | 356/300 |
| 6,002,990 A | 12/1999 | Hanna | |
| 6,049,762 A | 4/2000 | Ganz et al. | |

FOREIGN PATENT DOCUMENTS

| | | |
|---|---|---|
| JP | 58-127332 | 8/1983 |
| JP | A 59-43374 | 3/1984 |
| JP | A 60-70319 | 4/1985 |
| JP | 60-252228 | 12/1985 |
| JP | 61-132827 | 6/1986 |
| JP | A 3-120428 | 5/1991 |
| JP | 5-072037 | 3/1993 |
| JP | 7-120321 | 5/1995 |
| JP | 9-325070 | 12/1997 |
| JP | 2000-55808 | 2/2000 |
| JP | 2000-205952 | 7/2000 |
| JP | 2000-314662 | 11/2000 |
| JP | 2001-147159 | 5/2001 |

OTHER PUBLICATIONS

European Patent Office Communication dated Feb. 26, 2004 with attached European search report (2 pages).

* cited by examiner

*Primary Examiner*—Frank G. Font
*Assistant Examiner*—Layla Lauchman
(74) *Attorney, Agent, or Firm*—Kenyon & Kenyon

(57) ABSTRACT

In order to improve spectral measurement accuracy during high-speed wavelength shifting, the appropriate sensitivity of the detection system is maintained by, prior to measurement of a sample, measuring the voltage value, then storing this value into a table, and maintaining the voltage value to be applied to the photodetector, and during measurement of the sample, reading out the maintained voltage value and applying it to the photodetector.

6 Claims, 3 Drawing Sheets

FIG. 3

VOLTAGE DATA STORAGE TABLE (301)

| WAVELENGTH | VOLTAGE VALUE (V) |
|---|---|
| λ1 | 800 |
| λ2 | 810 |
| λ3 | 820 |
| λ4 | 830 |
| λ5 | 840 |
| λ6 | 850 |
| λ7 | 860 |
| ... | ... |

VOLTAGE VALUES FOR MEASURING SAMPLES WHEN THE WAVELENGTH SHIFTING SPEED IS EQUAL TO, TWICE, AND FOUR TIMES THAT OF VOLTAGE DATA STORAGE MEASUREMENT

WAVELENGTH SHIFTING SPEED: NO CHANGE (EQUAL)

| WAVELENGTH | APPLIED VOLTAGE VALUE (V) |
|---|---|
| λ1 | 800 |
| λ2 | 810 |
| λ3 | 820 |
| λ4 | 830 |
| λ5 | 840 |
| λ6 | 850 |
| λ7 | 860 |
| ... | ... |

WAVELENGTH SHIFTING SPEED: TWICE

| WAVELENGTH | APPLIED VOLTAGE VALUE (V) |
|---|---|
| λ1 | 800 |
| λ3 | 820 |
| λ5 | 840 |
| λ7 | 860 |
| ... | ... |

WAVELENGTH SHIFTING SPEED: FOUR TIMES

| WAVELENGTH | APPLIED VOLTAGE VALUE (V) |
|---|---|
| λ1 | 800 |
| λ5 | 840 |
| ... | ... |

SPECTROPHOTOMETER

BACKGROUND OF THE INVENTION

The present invention relates to a spectrophotometer.

Twin-beam spectrophotometers evaluate a sample in terms of spectral transmittance, spectral reflectance, and other optical characteristics, by splitting the beam emitted from a light source into a sample beam and a reference beam and using the ratio of the sample beam signal S and reference beam signal R obtained by converting photodetector output signals by use of an amplifier and an A/D converter.

During wavelength spectral measurement using such a spectrophotometer, changes in wavelength, $\lambda$, change the levels of signals S and R according to the particular geometric value of $E(\lambda).M(\lambda).D(\lambda)$ which consists of values such as the energy, $E(\lambda)$, of the light source, the efficiency, $M(\lambda)$, of the optical system, and the sensitivity, $D(\lambda)$, of the photodetector. The accuracy of the data measurements obtained from digital signals depends on the number of digits in the particular digital signal, and the rate of change due to wavelength is, for example, in visible and ultraviolet radiation regions, several tens to several hundreds of times as great. Thus, in the wavelength regions that the detection system cannot attain high sensitivity, the accuracy of the signal ratio with respect to the wavelengths at which the detection system can attain high sensitivity decreases to several tenths to several hundredths of times as great. Accordingly, measurement accuracy significantly decreases in low-sensitivity wavelength regions.

A means effective for avoiding such decreases in measurement accuracy according to the particular wavelength of the signal values is by adopting the so-called "differential feedback" method, in which, each time data is acquired, the signal threshold value that establishes the condition of Atar=(Amax+Amin)/2 . . . where A is signal R or S, whichever is the greater in level . . . is to be assigned and when A≦Amin or Amax≦A, the sensitivity of the photodetector is to be adjusted so that signal A always satisfies Amin≦A≦Amax. By providing such adjustment each time a data acquisition operation is to be performed, it is possible to obtain almost equal signal accuracy at all times, irrespective of the differences in sensitivity according to wavelength region.

Photomultipliers (also referred to as photomultiplier tubes) are most commonly used as the photodetectors for measurement in visible and ultraviolet radiation regions, and since the sensitivities of photomultipliers change according to the value of the voltage applied between the cathode and anode of the photomultiplier, its detection sensitivity can be adjusted by varying the value of the voltage to be applied. Output signals from the photomultiplier, however, vary with the product of the sixth to tenth power of (incident light intensity +applied voltage), and thus in a high-sensitivity wavelength region and in a low-sensitivity wavelength region, even if exactly the same correction voltage is applied, a difference in the magnitude of the signal value adjusted will arise from the difference in the original applied voltage. In the photomultiplier, although the magnitude of the output current is taken out as a signal level, if the output current increases too excessively, the output current itself will saturate and the resulting disturbance in the proportionality mentioned above will reduce measurement accuracy. For this reason, Atar is set to the vicinity of the upper limit of the range in which the output current from the photomultiplier does not saturate. In such a case, in order to avoid output saturation associated with voltage correction, the voltage to be applied when one voltage correction operation is to be performed is set to a relatively small value with a high-sensitivity wavelength as its reference.

In this method, Amin≦A≦Amax always holds when variations in wavelength with each data acquisition operation are sufficiently small in comparison to changes in sensitivity. However, when spectral measurement that requires high-speed wavelength shifting (changes the wavelength at high speed) takes place, changes in the sensitivity of the detection system due to changes in wavelength will increase according to the particular variation in data acquisition wavelength. The consequent decrease in the relative voltage correction value with respect to the particular change in detector sensitivity will reduce the number of digits in the digital signal value (Amin>>A) or saturate the output current of the photomultiplier (A>>Amax), thus resulting in equal measurement accuracy not being obtainable in the entire measuring wavelength region.

Since a wavelength region in which detection systems can attain high sensitivity must be selected as the basis for specifying the voltage correction value, the occurrence of the problem described above has been particularly significant in the wavelength regions that detection systems cannot attain high sensitivity.

Although this problem can be solved by conducting measurements at reduced wavelength shifting speeds, when a multitude of samples are to be measured or when the measuring wavelength range is too wide, reduction in the wavelength shifting speed takes a greater deal of time to perform one measuring operation. When a multitude of samples are to be measured, therefore, it takes a great deal of time to measure all samples accurately.

One method of solving the problem involved is by calculating the voltage correction value from the present voltage value by use of a function, as described in Japanese Application Patent Laid-Open Publication No. Hei-72037 (1993). According to this method, the voltage signal correction value calculated from the present voltage value will be incorporated during next data acquisition. When the wavelength shifting speed is increased, the difference, $|(\lambda 0-\lambda 1)|$, between the present wavelength, $\lambda 0$, and the next data acquisition wavelength, $\lambda 1$, will also increase in proportion to the speed. Therefore, this method poses the new problem that during spectral measurement in the wavelength band where the detection system abruptly changes in sensitivity, the amount of correction does not keep up with any changes in signal level or the amount of correction increases too significantly in itself.

During wavelength spectral measurement, the measuring wavelength will shift in one direction each time data is acquired. However, with the correction method where the voltage value for the previous data acquisition is to be incorporated into the present voltage value, accurate sensitivity correction is not possible.

To maintain constant spectral measurement accuracy, it is necessary that sample beam signal S or reference beam signal R, whichever is the greater in level, should be taken as signal A and that a signal value within a fixed range should always be obtained as the value of signal A. In order to achieve this, the voltage to be applied to the photomultiplier is controlled to provide differential feedback correction so that the value of signal A always stays within a fixed range. With the prior correction method, however, the energy of the light source, the optical system, and the wavelength characteristics at the sensitivity of the photodetector do not permit constant detector output to be maintained when the measurements that require high-speed wavelength shifting (changing) are conducted, because the relative amount of correction with respect to a change in sensitivity will decrease, especially in the wavelength regions that the sensitivity of the detection system is low. The appearance of such a problem has been significant, especially in the wavelength regions that detection systems cannot attain high sensitivity.

Although such a problem can be solved by reducing the wavelength shifting speed, when the measuring wavelength range is too wide, reduction in the wavelength shifting speed takes too much time to perform measurements.

This problem also applies to a single-beam spectrophotometer that uses a single beam to perform spectral measurements.

SUMMARY OF THE INVENTION

It is the object of the present invention to supply a spectrophotometer that can perform spectral measurements within a short time and with high accuracy.

The present invention is to minimize any influences of changes in detection system sensitivity and obtain higher signal accuracy, even during the measurement process that requires high-speed wavelength shifting, first by, prior to measurement of a sample, measuring and storing into a table the voltage value to be used for controlling the sensitivity of the photodetector, and then by, during measurement of the sample, providing sensitivity correction control using the stored voltage value.

More specifically, the present invention is to supply a spectrophotometer having a light source for emitting an optical beam, a photodetector that changes in sensitivity with changes in applied voltage, an analog-to-digital converter by which electrical signals from said photodetector are converted into digital signals, a digital storage means for storage of said digital signals corresponding to the light of said beam, and a sensitivity control means for controlling the sensitivity of said photodetector so that the signal values of said digital signals stay within a predetermined range, wherein the spectrophotometer is characterized in that said sensitivity control means is further equipped with a sensitivity correction data storage means by which sensitivity correction data for adjusting the sensitivity of said photodetector is stored for each wavelength, and a sensitivity correction means for adjusting the sensitivity of said photodetector by applying the sensitivity correction data stored into said sensitivity correction data storage means.

Also, the present invention is to supply a spectrophotometer having a light source for emitting an optical beam, a beam splitting means by which the beam that has been emitted from said light source is split into two beams, a photodetector that changes in sensitivity with changes in applied voltage, an analog-to-digital converter by which electrical signals from said photodetector are converted into digital signals, a digital storage means for storage of said digital signals corresponding to the light of said two beams, a sensitivity control means for controlling the sensitivity of said photodetector so that the signal values of said digital signals stay within a predetermined range, and a calculation means for calculating the ratio of the digital signals corresponding to the two beams stored into said digital storage means, wherein the spectrophotometer is characterized in that said sensitivity control means is further equipped with a sensitivity correction data storage means by which sensitivity correction data for adjusting the sensitivity of said photodetector is stored for each wavelength, and a sensitivity correction means for adjusting the sensitivity of said photodetector by applying the sensitivity correction data stored into said sensitivity correction data storage means.

Also, said sensitivity control means is characterized in that it stores into said sensitivity correction data storage means the sensitivity correction data corresponding to measuring wavelength bands, and during the measurement of a sample, adjusts the sensitivity of said photodetector by applying the sensitivity correction data stored within said sensitivity correction data storage means.

Also, said sensitivity control means is characterized in that it provides said photodetector with sensitivity correction control in order for the beam signal of the photodetector to stay within a predetermined range during the measurement of a sample that changes wavelength at high speed.

Also, said sensitivity control means is characterized in that it provides said photodetector with sensitivity correction control in order for one of the two beam signals of the photodetector to stay within a predetermined range during the measurement of a sample that changes wavelength at high speed.

BRIEF DESCRIPTION OF THE DRAWINGS

FIG. 3 is a diagram showing the relationship between the voltage data storage table of the ultraviolet/visible region spectrophotometer shown in FIG. 1, and the applied voltage value existing during measurement of the sample.

DETAILED DESCRIPTION OF THE PREFERRED EMBODIMENT

Embodiments of the present invention are described in detail below taking as an example a twin-beam spectrophotometer which has a wavelength spectral measuring capability.

Figure 1:
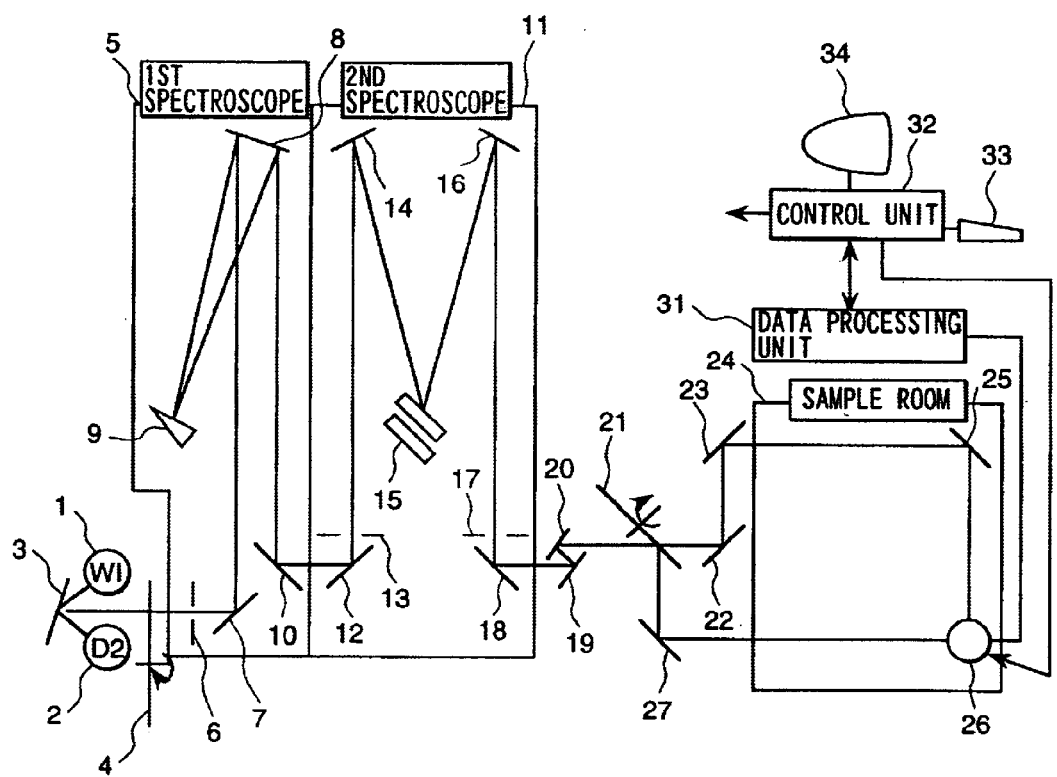
FIG. 1 is a functional block diagram of an ultraviolet/visible region spectrophotometer, an embodiment of the present invention.

FIG. 1 is a functional block diagram of an ultraviolet/visible region spectrophotometer, an embodiment of the present invention. The light source consists of a combination of an MI lamp 1, which emits light of a visible region, and a D2 lamp 2, which emits light of an ultraviolet region. The beam that has been emitted from the light source is reflected by a light source selection mirror 3 and then enters a first spectroscope 5 through a rotating shutter 4.

First spectroscope 5 receives light via a split 6, and the light enters a prism 9 via mirrors 7 and 8. Prism 9 splits the incident light into beams and emits the beams towards said mirror 8. After receiving the split beams from prism 9, mirrors 8 and 10 transfer the beams to a second spectroscope 11.

Second spectroscope 11 receives the incident beams via a mirror 12, a slit 13, and a mirror 14, and transfers the beams to a diffraction grating 15. After splitting the incident beams, diffraction grating 15 emits the beams via a mirror 16, a slit 17, and a mirror 18.

After receiving the beams from second spectroscope 11, mirrors 19 and 20 transfer the beams to a rotating spectral mirror 21, where the beams are then branched into two optical paths. The reference beam, which is one of the beams, enters a samples room 24 via mirrors 22 and 23, and after the beam has been reflected directly towards a photodetector 26 by a mirror 25. The sample beam, which is the other beam, enters samples room 24 via mirror 27, and then enters said photodetector 26 via the sample (not shown in the figure). A photomultiplier is used as photodetector 26.

Under the control of control unit 32, data-processing unit 31 receives a detection signal from said photodetector 26 and processes the signal.

Control unit 32 has a control processing program and a voltage data storage table, which is a sensitivity correction data storage means, and performs a control process comprising steps of controlling the driving motors (not shown in the figure) that drive said data-processing unit 31, light source selection mirror 3, rotating shutter 4, prism 9, and rotating spectral mirror 21 in accordance with entered instructions from an input unit 33, controlling the applied voltage of photodetector 26, and displaying samples measuring conditions and measurement results on a display unit 34.

Data-processing unit 31, control unit 32, input unit 33, and display unit 34 are components of a compact (personal) computer system, and each unit contains a RAM.

Figure 2:
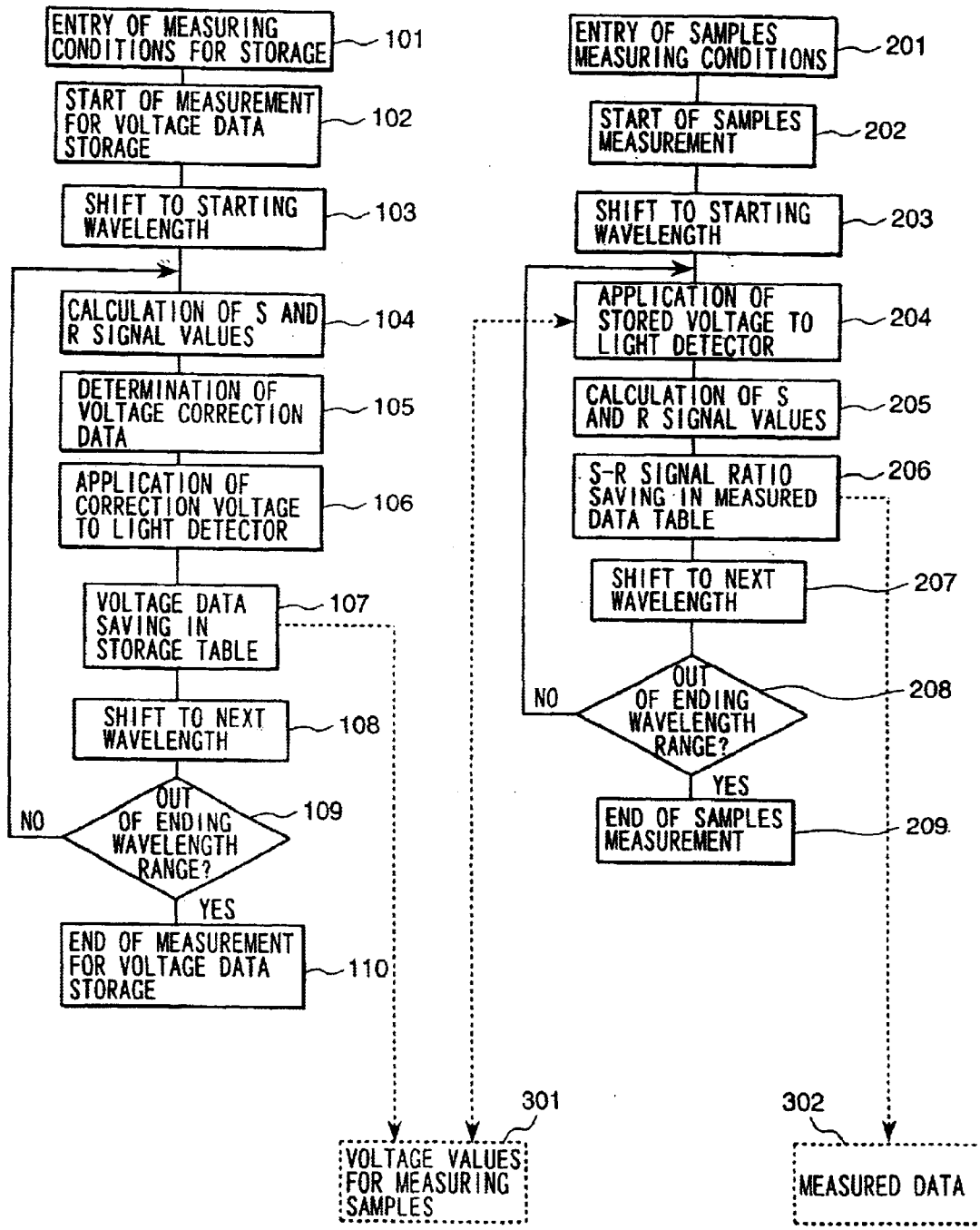
FIG. 2 is a flowchart of the control process that the control unit of the ultraviolet/visible region spectrophotometer shown in FIG. 1 autonomously performs or gets the data-processing unit to perform.

Next, the control process 31 performed by said control unit 32 is described below. FIG. 2 is a flowchart of the control process that the control unit 32 itself performs or gets data-processing unit 31 to perform. FIG. 3 shows the relationship between the voltage data storage table and the applied voltage value existing during measurement of the sample.

First, the processing sequence relating to voltage data storage and measurement is described below.

Step 101

Conditions for storing and measuring the voltage value to be used to control photodetector 26 are entered in accordance with the instructions of input unit 33.

Step 102

The voltage data storage and measurement process is started, subject to the corresponding instruction.

Step 103

The wavelength driving motor for changing the measuring wavelength is controlled to move prism 9 and diffraction grating 15 to the starting wavelength of measurement.

Step 104

The output signal from photodetector 26 is amplified and A/D converted to obtain a sample beam signal S and a reference beam signal R.

Step 105

The correction voltage value is determined from the signal values that were obtained in step 104 above.

Step 106

A voltage based on the correction voltage value that was determined in step 105 above is applied to photodetector 26.

Step 107

The present voltage value is saved in the present wavelength position of a voltage data storage table 301.

Step 108

The wavelength driving motor is controlled so as to achieve shifting to the next measuring wavelength. The wavelength shifting interval in this case provides the basis for shifting the next sample-measuring wavelength and must therefore be set to a sufficiently short value so that the sensitivity of the detection system changes too significantly. The sensitivity of the detection system undergoes characteristic changes according to the particular design specifications of the apparatus, such as the energy of the light source, the efficiency of the optical system, and the sensitivity characteristics of the photodetector. It is therefore advisable to provide independent limits for each apparatus component so that the wavelength shifting speed for storing and measuring the voltage value can be selected only from a fixed range.

Step 109

It is judged whether the ending wavelength within the required measuring range has been exceeded, and if the measuring wavelength is not in excess of the ending wavelength, control will be returned to step 104 and the measurement will be repeated. When the ending wavelength is exceeded, control will proceed to the next step, 110.

Step 110

The voltage data storage and measurement process is terminated.

Next, the processing sequence relating to measurement of a sample is described below. This sequence is executed, only when a sample is mounted at the sample beam side of the samples room and voltage data is present in voltage data storage table 301.

Step 201

Sample-measuring conditions are entered from input unit 33. When the instruction to use a stored voltage value is entered, if no voltage data is present in voltage data storage table 301, a warning message will be displayed on display unit 34.

Step 202

The sample-measuring process is started, subject to the corresponding instruction.

Step 203

The wavelength driving motor is controlled to move prism 9 and diffraction grating 15.

Step 204

As shown in FIG. 3, the voltage value corresponding to the present wavelength position in voltage data storage table is read out and applied to photodetector 26. The voltage at the present wavelength position in this case becomes the optimum voltage value for the present wavelength position which has been obtained during voltage data storage and measurement beforehand. Even when high-speed wavelength shifting is selected, therefore, the appropriate voltage can be applied to photodetector 26 and thus the insufficiency in the number of digits in the signal value, the saturation of output, or other problems do not occur.

Step 205

The output signal from photodetector 26 is amplified and A/D converted to obtain a sample beam signal S and a reference beam signal R and then to calculate the data ratio between signals S and R.

Step 206

The value that was calculated in step 205 above is saved in a voltage data storage table 302.

Step 207

The wavelength driving motor is controlled so as to achieve shifting to the next measuring wavelength.

Step 208

It is judged whether the ending wavelength within the required measuring range has been exceeded, and if the measuring wavelength is not in excess of the ending wavelength, control will be returned to step 204 and the measurement will be repeated. When the ending wavelength is exceeded, control will proceed to the next step, 209.

Step 209

The sample-measuring process is terminated.

[Effects of the Invention]

According to the present invention, since the voltage value for controlling the sensitivity of the photodetector is measured and stored into a table prior to measurement of a sample, and since sensitivity correction control using the stored voltage value is provided during measurement of the sample, even when the measurement process that requires high-speed wavelength shifting is performed, any influences of changes in detection system sensitivity can be minimized and higher signal accuracy can be obtained.

What is claimed is:

1. A spectrophotometer having
    a light source for emitting a sample optical beam and a reference optical beam,
    a photodetector that changes in sensitivity with changes in applied voltage,
    an analog-to-digital converter by which electrical signals from said photodetector are converted into digital signals,
    a digital storage means for storage of said digital signals corresponding to the light of said beam, and
    a control means for controlling a voltage applied to said photodetector,
    wherein said control means is further equipped with an applied voltage storage means for previously storing said applied voltage corresponding to a wavelength thereof, said applied voltage being corrected so as to be in a proper range, wherein
        when measuring a sample, so as to detect said sample optical beam and said reference optical beam, a voltage value corresponding to said wavelength to be measured is read out from said applied voltage storage means so as to apply a voltage having said voltage value to said photodetector.

2. A spectrophotometer having
    a light source for emitting an optical beam,
    a beam splitting means by which said optical beam that has been emitted from said light source is split into two beams of a sample optical beam and a reference optical beam,
    a photodetector that changes in sensitivity with changes in applied voltage,
    an analog-to-digital converter by which electrical signals from said photodetector are converted into digital signals, and
    a control means for controlling said applied voltage to said photodetector and for calculating a ratio of the outputs of said photodetector corresponding to said two beams,
    wherein said control means is further equipped with an applied voltage storage means for previously storing said applied voltage corresponding to a wavelength thereof, said applied voltage being corrected so as to be in a proper range,
    wherein when measuring a sample so as to detect said sample optical beam and said reference optical beam, a voltage value corresponding to said wavelength of said sample optical beam and said reference optical beam to be measured is read out from said applied voltage storage means so as to apply a voltage having said voltage value to said photodetector.

3. A spectrophotometer as set forth in claim 1, wherein when said voltage value is stored in said applied voltage storage means, said sample is measured with a wavelength movable velocity limited within a predetermined range.

4. A spectrophotometer as set forth in claim 2, wherein when said voltage value is stored in said applied voltage storage means, said sample is measured with a wavelength movable velocity limited within a predetermined range.

5. A spectrophotometer as set forth in claim 1, further comprising:
    a display for displaying a state and result obtained by measuring the sample, and
    when measuring the sample, if said voltage value is not stored in said applied voltage storage means, a warning message is displayed on said display.

6. A spectrophotometer as set forth in claim 2, further comprising:
    a display for displaying a state and result obtained by measuring the sample, and
    when measuring the sample, if said voltage value is not stored in said applied voltage storage means, a warning message is displayed on said display.

* * * * *